(12) United States Patent
Kim et al.

(10) Patent No.: US 9,296,325 B2
(45) Date of Patent: Mar. 29, 2016

(54) VEHICLE USB PORT

(71) Applicant: NHK SPRING CO., LTD., Yokohama-shi (JP)

(72) Inventors: Donghyoun Kim, Yokohama (JP); Hidemi Haga, Yokohama (JP); Takeshi Muto, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/620,102

(22) Filed: Feb. 11, 2015

(65) Prior Publication Data

US 2015/0244127 A1   Aug. 27, 2015

(30) Foreign Application Priority Data

Feb. 24, 2014  (JP) ................. 2014-033132

(51) Int. Cl.
| | |
|---|---|
| *H01R 13/447* | (2006.01) |
| *B60N 3/14* | (2006.01) |
| *H01R 13/52* | (2006.01) |
| *B60R 11/02* | (2006.01) |
| *B60R 7/10* | (2006.01) |
| *B60R 11/00* | (2006.01) |

(52) U.S. Cl.
CPC ... *B60N 3/14* (2013.01); *B60R 7/10* (2013.01); *B60R 11/02* (2013.01); *H01R 13/447* (2013.01); *H01R 13/5213* (2013.01); *B60R 2011/0003* (2013.01); *B60R 2011/0015* (2013.01); *B60R 2011/0075* (2013.01); *H01R 2201/26* (2013.01)

(58) Field of Classification Search
CPC ............. H01R 13/447; H01R 2201/26; H01R 13/453; H01R 13/4532; H01R 13/5213; B60R 2011/0207; B60R 7/10; B60R 11/02; B60R 2011/0015; B60R 2011/0003; B60R 16/02; B60R 2021/01115; B60R 2300/408
USPC ........ 439/135, 138, 142, 34; 174/66, 67, 135; 296/37.15, 37.12, 37.9, 24.34
See application file for complete search history.

(56) References Cited

U.S. PATENT DOCUMENTS

| | | | |
|---|---|---|---|
| 8,104,816 B2 * | 1/2012 | Lupton, III ............... | B60R 7/06 296/24.34 |
| 8,513,522 B2 * | 8/2013 | Liang ................... | H05K 5/0239 174/135 |
| 8,528,956 B1 * | 9/2013 | Winiger ................... | B60R 7/04 296/24.34 |

(Continued)

FOREIGN PATENT DOCUMENTS

JP      2006-273127 A      10/2006

*Primary Examiner* — Abdullah Riyami
*Assistant Examiner* — Harshad Patel
(74) *Attorney, Agent, or Firm* — Knobbe Martens Olson & Bear LLP

(57) ABSTRACT

A vehicle USB port including: a base body attached to a vehicle-body-side member; a hook main body that is provided with a hinge portion rotatably attached to the base body and a hook portion to anchor an anchored member, and that is rotatable between an in-use position in which the hook portion is usable and a stowed position in which the hook portion is not used; a hook main body retaining portion that is formed at the base body and that retains the hook main body moved to the stowed position; a port opening that is formed at the hook main body retaining portion and that is covered by the hook main body moved to the stowed position; and a USB port that is provided in a position facing the port opening, and to which a USB cable can be coupled through the port opening.

5 Claims, 11 Drawing Sheets

(56) References Cited

U.S. PATENT DOCUMENTS

| | | | |
|---|---|---|---|
| 9,016,752 B2 * | 4/2015 | Myers | B60R 7/06 296/24.34 |
| 9,180,803 B2 * | 11/2015 | Cleary | B60N 2/4613 |
| 2015/0145272 A1 * | 5/2015 | Cleary | B60N 3/14 296/37.16 |

* cited by examiner

VEHICLE USB PORT

CROSS-REFERENCE TO RELATED APPLICATION

This application is based on and claims priority under 35 USC 119 from Japanese Patent Application No. 2014-033132 filed on Feb. 24, 2014, the disclosure of which is incorporated by reference herein.

BACKGROUND

1. Technical Field

The present invention relates to a vehicle USB port applied to a vehicle such as an automobile.

2. Related Art

Japanese Patent Application Laid-Open (JP-A) No. 2006-273127 describes a configuration in which an accessory socket that can be used as a power source extraction port is provided to a center console positioned between a driver's seat and a front passenger seat.

However, in conventional configurations an occupant needs to connect a USB converter to an accessory socket when using a USB device in a vehicle. It is therefore conceivable to provide a USB port to a center console or the like. In such cases, it is preferable to provide a shutter to cover and protect the USB port when not in use; however providing a shutter would increase the number of components.

SUMMARY

In consideration of the above circumstances, an object of the present invention is to provide a vehicle USB port that can protect a USB port without increasing the number of components.

A first aspect of the present invention provides a vehicle USB port including:

a base body attached to a vehicle-body-side member;

a hook main body that is provided with a hinge portion rotatably attached to the base body and a hook portion to anchor an anchored member, and that is rotatable between an in-use position in which the hook portion is usable and a stowed position in which the hook portion is not used;

a hook main body retaining portion that is formed at the base body and that retains the hook main body moved to the stowed position;

a port opening that is formed at the hook main body retaining portion and that is covered by the hook main body moved to the stowed position; and a USB port that is provided in a position facing the port opening, and to which a USB cable can be coupled through the port opening.

In the vehicle USB port of the first aspect of the present invention, the hook main body provided with the hook portion to anchor an anchored member such as a bag or a shopping bag, is rotatably attached to the base body provided to the vehicle-body-side member by the hinge portion. The hook main body moves between the in-use position in which the hook portion is usable and the stowed position in which the hook portion is not used. When the hook main body moves to the in-use position, therefore, the USB port provided in a position facing the port opening formed at the base body can be coupled to a USB cable through the port opening. When moved to the stowed position, the hook main body is retained by the hook main body retaining portion, and the port opening formed at the base is covered and protected by the hook main body moved to the stowed position. Since a hook main body is normally provided in a vehicle cabin interior in order to hang a bag, a shopping bag, or the like thereon, there is no need to provide a separate shutter in order to protect the USB port, and there is no increase in the number of components.

A second aspect of the present invention provides the vehicle USB port of the first aspect, wherein in the hook main body:

one end of the hook main body is the hinge portion;

the other end of the hook main body is the hook portion; and a portion of the hook main body between the hinge portion and the hook portion configures a lid portion covering the port opening.

In the vehicle USB port of the second aspect of the present invention, the lid portion covering the port opening is provided to the hook main body between the hinge portion at the one end of the hook main body and the hook portion at the other end of the hook main body. This enables the hinge portion and the hook portion to prevent dust and the like from adhering to the USB port through the port opening. Protection performance of the USB port is thereby improved.

A third aspect if the present invention provides the vehicle USB port of the first aspect or the second aspects, wherein the hinge portion is attached to one portion of the base body, and the inside of the base includes a frame shaped raised portion forming the hook main body retaining portion.

In the vehicle USB port of the third aspect of the present invention, the hinge portion is attached to one portion of the base body, and the inside of the base includes the frame shaped raised portion forming the hook main body retaining portion. This enables the frame shaped raised portion to prevent dust and the like from adhering to the USB port through the port opening. Protection performance of the USB port is thereby further improved.

A fourth aspect of the present invention provides the vehicle USB port of any one of the first through third aspects, wherein the USB port is fixed to the base plate attached to the vehicle-body-side member, and a leading end of the USB port faces the port opening by attaching the base body to the vehicle-body-side member.

In the vehicle USB port of the fourth aspect of the present invention, the USB port is fixed to the base plate attached to the vehicle-body-side member, and the leading end of the USB port faces the port opening by attaching the base body to the vehicle-body-side member. Positional alignment of the USB port and the port opening of the base body is thereby facilitated, and fitting operation is improved.

A fifth aspect of the present invention provides the vehicle USB port of any one of the first through fourth aspects, wherein:

the base body is configured as a table that is rotatable coaxially to the hook main body between the stowed position and the in-use position; and an interference prevention cutout is formed at the table such that the table does not interfere with the hook main body in either the in-use position or the stowed position.

In the vehicle USB port of the fifth aspect of the present invention, the table is rotated coaxially to the hook main body between the stowed position and the in-use position. Since the interference prevention cutout is formed at the table, the table does not interfere with the hook main body in either the in-use position or the stowed position. This enables the hook main body to be moved to the in-use position and the USB port to be used, regardless of whether the table is in the stowed position or the in-use position.

The first aspect of the present invention enables the USB port to be protected without increasing the number of components.

The second aspect of the present invention enables the protection performance of the USB port to be improved.

The third aspect of the present invention enables the protection performance of the USB port to be further improved.

The fourth aspect of the present invention enables the fitting operation to be improved.

The fifth aspect of the present invention enables the USB port to be used, regardless of whether the table is in the stowed position or the in-use position

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
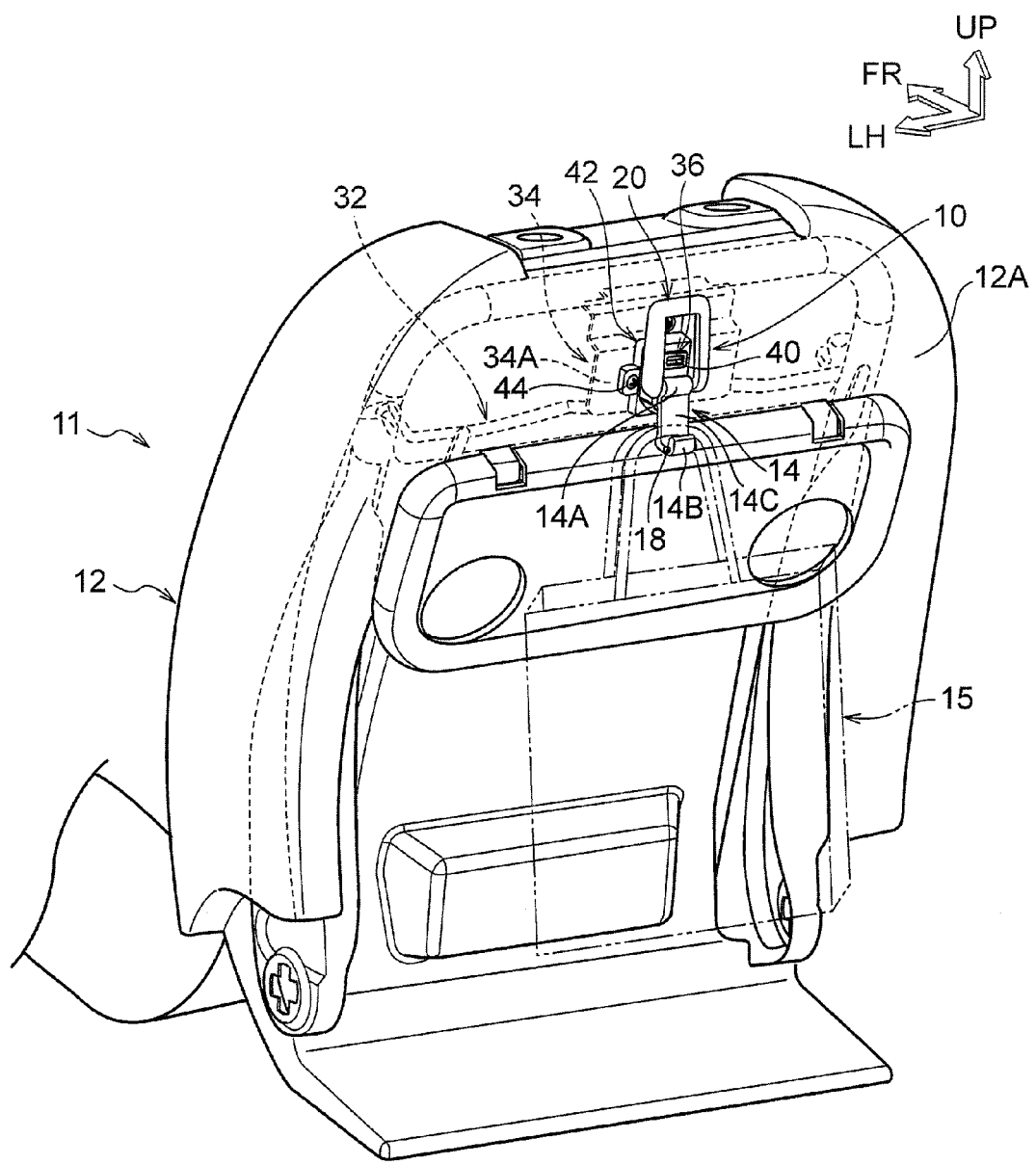
FIG. 1 is a perspective view illustrating a port usable state of a vehicle USB port of a first exemplary embodiment of the invention, viewed diagonally from the rear.

Explanation follows regarding a vehicle USB port according to a first exemplary embodiment of the invention, with reference to FIG. 1 to FIG. 4. Note that, in the drawings as appropriate, the arrow FR indicates the vehicle front direction, the arrow LH indicates the vehicle left direction (one vehicle width direction side), and the arrow UP indicates the vehicle upper direction of a vehicle (automobile) to which the vehicle USB port according to the present invention is provided.

Figure 2:
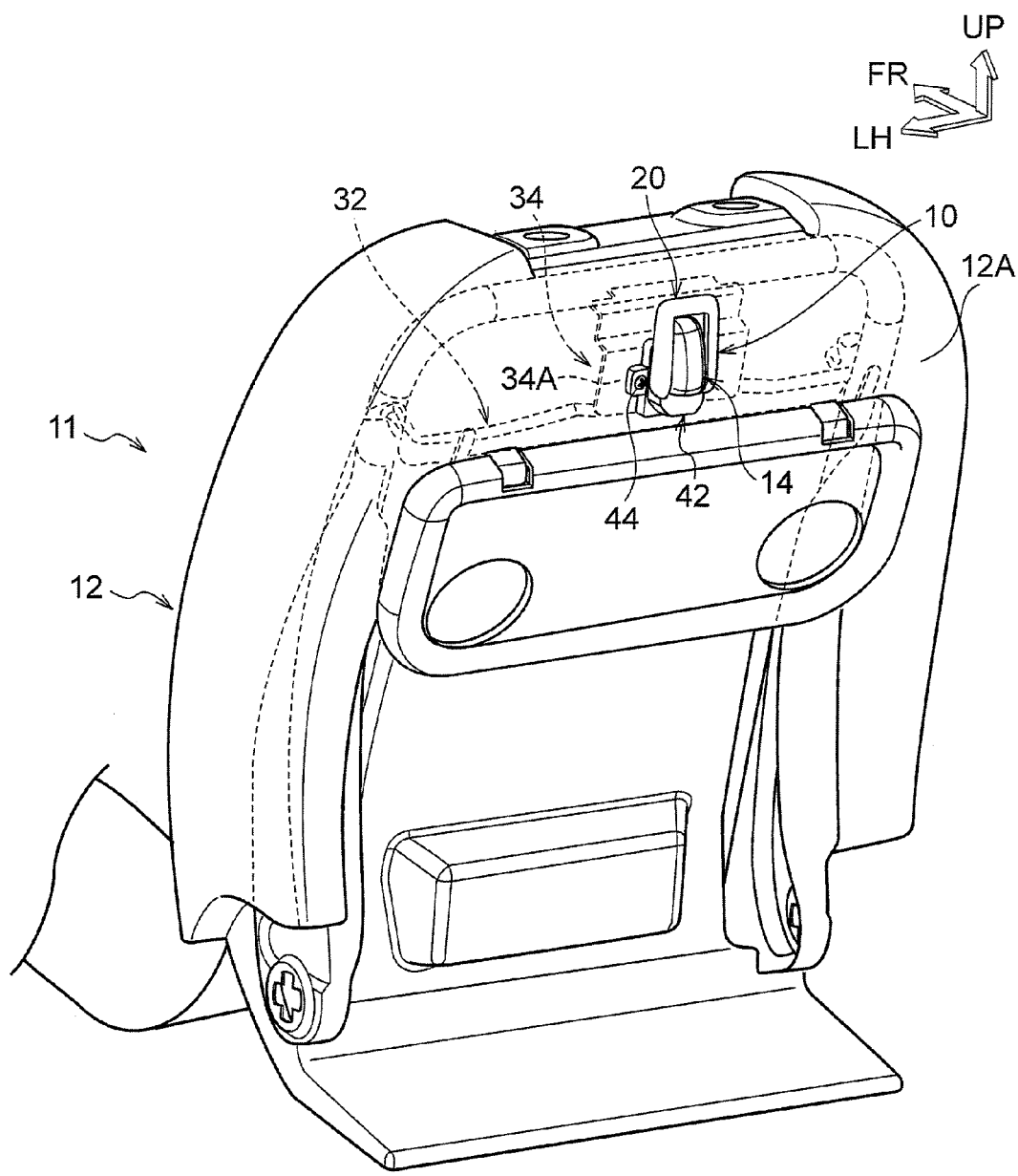
FIG. 2 is a perspective view illustrating a port not-in-use state of a vehicle USB port of the first exemplary embodiment of the invention, viewed diagonally from the rear.

FIG. 1 is a perspective view illustrating a port usable state of a vehicle USB port 10, as viewed diagonally from the vehicle rear. FIG. 2 is a perspective view illustrating a port not-in-use state of the vehicle USB port 10, viewed diagonally from the vehicle rear. As an example, the vehicle USB port 10 is provided at an upper portion of a back face 12A of a seatback 12 of a seat 11.

As illustrated in FIG. 1, a hook main body 14 is provided to the vehicle USB port 10, and a bag 15, a shopping bag from a convenience store, or the like, serving as an anchored member, can be hung from the hook main body 14.

Figure 3:
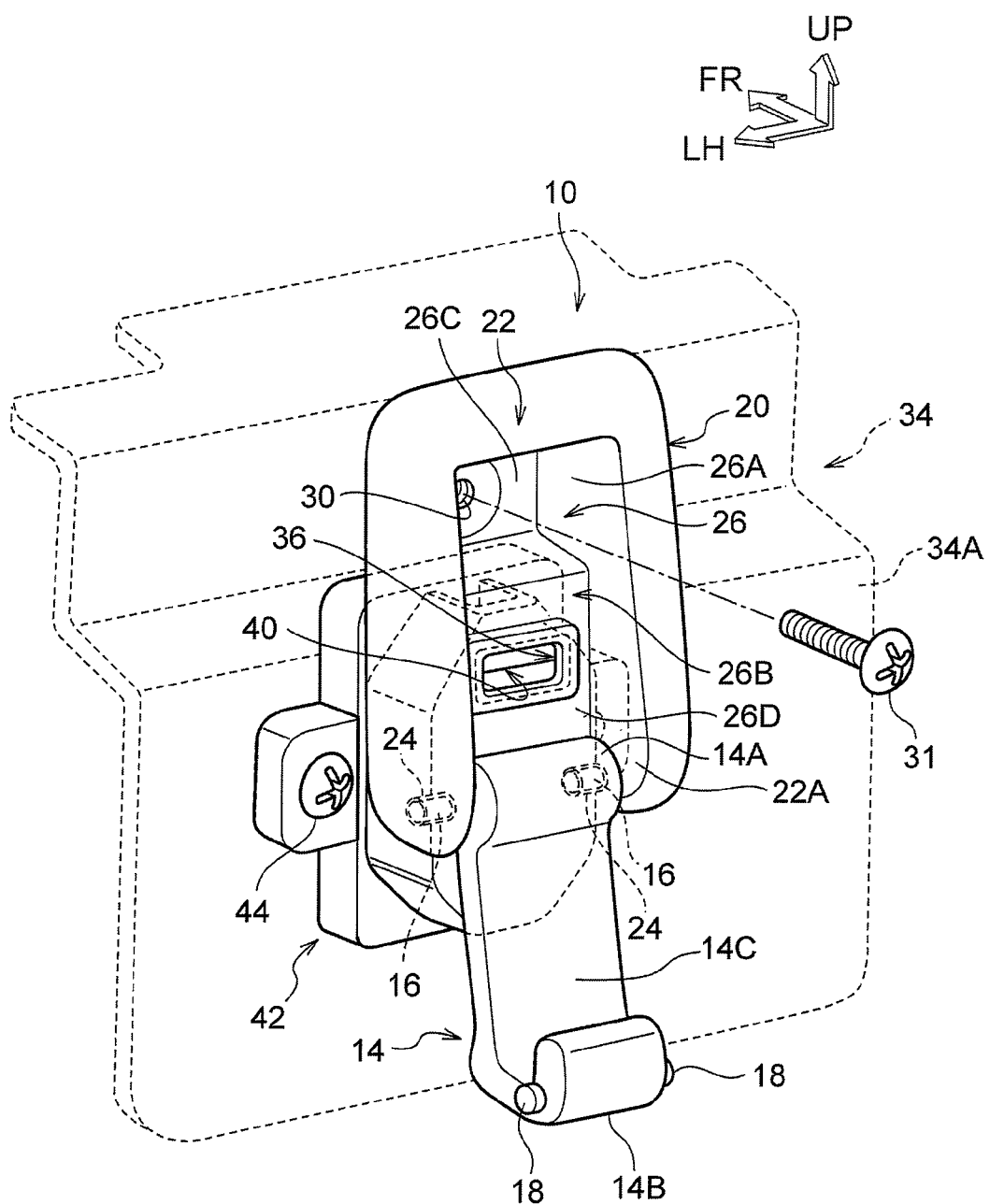
FIG. 3 is a perspective view illustrating a vehicle USB port of the first exemplary embodiment of the invention, viewed diagonally from the rear.

As illustrated in FIG. 3, the hook main body 14 is formed in an elongated shape, and one end portion forms a hinge portion 14A. Rotation shafts 16, protruding toward the left and right directions, are formed at the hinge portion 14A. The other end portion of the hook main body 14 forms a hook portion 14B. In a state in which the hook main body 14 has moved into the usage position illustrated in FIG. 3, the hook portion 14B is in an anchoring state that bends toward the vehicle rear and then bends toward the vehicle upper direction, and a bag, a bag from a convenience store, or the like can be hung on the hook portion 14B. Further, protrusions 18 are formed at the hook portion 14B, protruding toward the left and right direction outsides.

Therefore, the hook main body 14 can rotate about the rotation shafts 16 of the hinge portion 14A as the center of rotation, between the in-use position illustrated in FIG. 1 in which the hook portion 14B is usable, and a stowed position illustrated in FIG. 2 in which the hook portion 14B is not in use (unusable).

As illustrated in FIG. 1, the hinge portion 14A of the hook main body 14 is attached to a lower portion of a base body 20 of the hook main body 14. Specifically, the base body 20 is fixed to a rear face 34A of a bracket 34, serving as a vehicle-body-side member and provided above a seatback top panel 32. In a state in which the base body 20 is attached to the upper portion of the back face 12A of the seatback 12, the base body 20 includes a frame shaped raised portion 22, formed in a rectangular frame shape protruding out toward the vehicle rear at an outer peripheral portion. A left-right direction center portion of a lower portion 22A of the frame shaped raised portion 22 is cut out, and the hinge portion 14A of the hook main body 14 is attached at the inside of the cutout. The rotation shafts 16 are axially supported so as to be rotatable by a pair of left and right shaft bearing portions 24 formed at the lower portion 22A of the frame shaped raised portion 22.

Although not illustrated in the drawings, a biasing means such as a spring may be provided between the hinge portion 14A of the hook main body 14 and the lower portion 22A of the frame shaped raised portion 22, configured so as to bias the hook main body 14 in the in-use position toward the direction of the stowed position.

In a state in which the base body 20 is attached to the upper portion of the back face 12A of the seatback 12, the inside of the frame shaped raised portion 22 of the base body 20 forms a hook main body housing recess 26 serving as a hook main body retaining portion recessed toward the vehicle front side with respect to the frame shaped raised portion 22. When the hook main body 14 has been moved to the stowed position and the hook main body 14 is pressed inside the hook main body housing recess 26, the hook main body 14 is stowed inside the hook main body housing recess 26, as illustrated in FIG. 2. The left and right protrusions 18 of the hook portion 14B contact left and right side walls 26A of the hook main body housing recess 26, so that the hook main body 14 is retained in the stowed position.

An upper portion 26C of a bottom portion 26B of the hook main body housing recess 26 is formed deeper than a lower portion 26D of the bottom portion 26B (forming the front side position), and is capable of housing the hook portion 14B of the hook main body 14. An attachment hole 30 is formed at the upper portion 26C of the bottom portion 26B, and as illustrated in FIG. 1, the base body 20 is fixed to the rear face 34A of the bracket 34 provided above the seatback top panel 32, by a fixing member 31 such as a screw that is inserted through the attachment hole 30 from the vehicle rear side.

Figure 4:
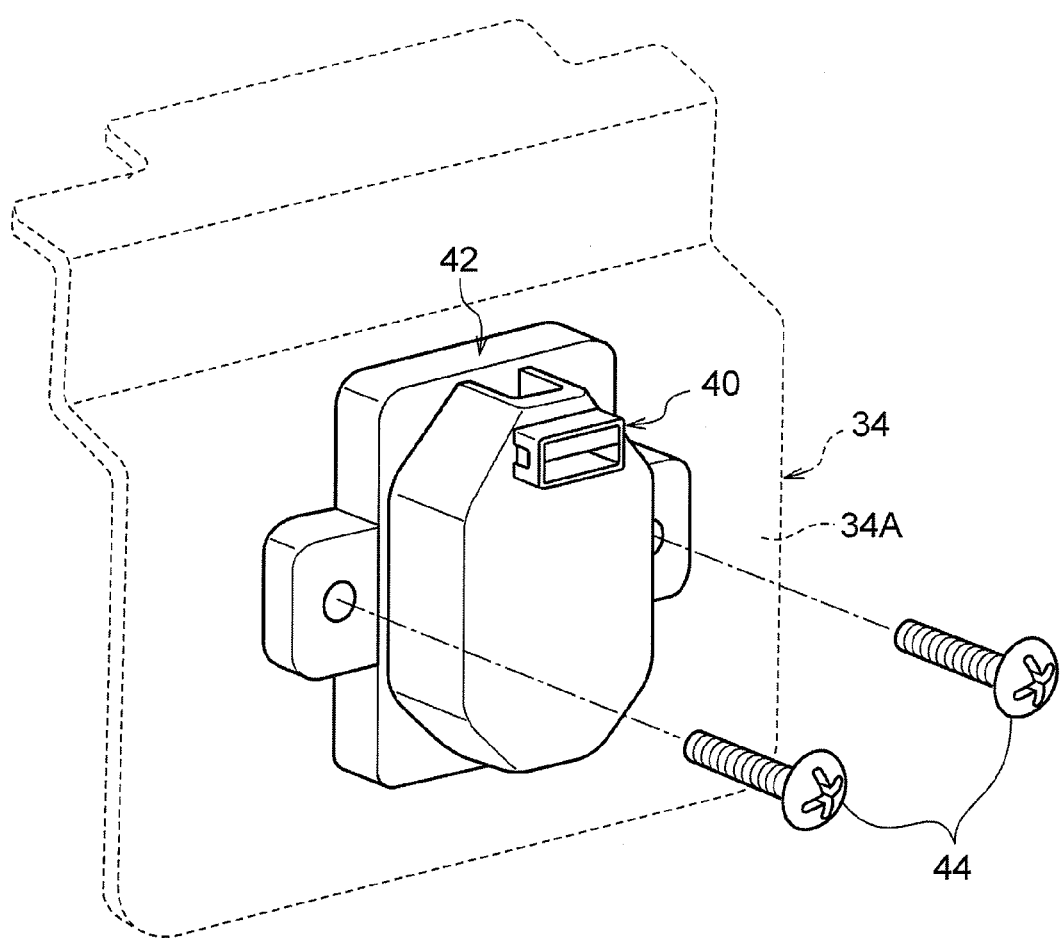
FIG. 4 is a perspective view illustrating a base plate of a vehicle USB port of the first exemplary embodiment of the invention, viewed diagonally from the rear.

As illustrated in FIG. 4, a USB port 40 is fixed to a base plate 42 in a state protruding toward the vehicle rear, and the base plate 42 is attached to the rear face 34A of the bracket 34 by fixing members 44, such as screws.

As illustrated in FIG. 3, a rectangular shaped port opening 36 is formed with its length direction in the vehicle left-right direction at the lower portion 26D of the bottom portion 26B of the hook main body housing recess 26. A leading end of the USB port 40 faces the port opening 36. The leading end of the USB port 40 is made to face the port opening 36 by attaching the base plate 42 to the bracket 34, then attaching the bracket 34 to the base body 20.

A lid portion 14C is formed between the hinge portion 14A and the hook portion 14B of the hook main body 14. As illustrated in FIG. 2, the lid portion 14C covers the port opening 36 when the hook main body 14 moves to the stowed position. The hook main body 14 thereby enables water, dust, and the like to be prevented from adhering to the USB port 40 through the port opening 36.

First Exemplary Embodiment Operation and Advantageous Effects

Explanation follows regarding operation and advantageous effects of the first exemplary embodiment.

In the vehicle USB port 10 according to the present exemplary embodiment, the hook main body 14 including the hook portion 14B for engaging the bag 15, a shopping bag, or the like is rotatably attached to the pair of left and right shaft bearing portions 24 formed at the lower portion 22A of the frame shaped raised portion 22 of the base body 20, by the rotation shafts 16 of the hinge portion 14A. The hook main body 14 is rotated between the in-use position illustrated in FIG. 1 in which the hook portion 14B is usable, and the stowed position illustrated in FIG. 2 in which the hook portion 14B is not in use.

As illustrated in FIG. 1 and FIG. 3, the USB port 40 provided in a position facing the port opening 36 can be coupled to a USB cable through the port opening 36 when the hook main body 14 has been moved to the in-use position.

The hook main body 14 is retained in the hook main body housing recess 26 of the base body 20 when the hook main body 14 has moved to the stowed position. The lid portion 14C of the hook main body 14 covers the port opening 36 when the hook main body 14 has moved to the stowed position. The hook main body 14 can thereby prevent water, dust, and the like from adhering to the USB port 40 through the port opening 36, and the USB port 40 can be protected. The hook main body 14 is normally provided at the upper portion of the back face 12A of the seatback 12 of the seat 11 in order to hang the bag 15, a shopping bag, or the like thereon. There is no need, therefore, to provide a separate shutter in order to protect the USB port 40, and there is no increase in the number of components.

In the present exemplary embodiment, the lid portion 14C covering the USB port 40 on the hook main body 14 is provided between the hinge portion 14A at the one end and the hook portion 14B at the other end of the hook main body 14. The hinge portion 14A and the hook portion 14B can thereby prevent water, dust, and the like from entering the port opening 36 from the vehicle up-down direction and adhering to the USB port 40. Protection performance of the USB port 40 is accordingly improved.

In the present exemplary embodiment, the base body 20 includes the frame shaped raised portion 22, and the hook main body 14 can be housed in the hook main body housing recess 26 provided inside the frame shaped raised portion 22 and recessed with respect to the frame shaped raised portion 22. The port opening 36 is formed at the bottom portion 26B of the hook main body housing recess 26. The frame shaped raised portion 22 of the base body 20 can therefore prevent water, dust, and the like entering the port opening 36 from the periphery and adhering to the USB port 40. The protection performance of the USB port 40 is thereby further improved.

In the present exemplary embodiment, the leading end of the USB port 40, which is fixed to the base plate 42 attached to the bracket 34, faces the port opening 36 by attaching the base body 20 to the bracket 34. This facilitates positional alignment of the USB port 40 and the port opening 36 of the base body 20, and improves assembly work efficiency.

Second Exemplary Embodiment

Next, explanation follows regarding a vehicle USB port 48 according to a second exemplary embodiment of the invention, with reference to FIG. 5 to FIG. 10. Note that the same reference numerals are applied to similar configuration portions to those of the first exemplary embodiment etc. as previously described, and explanation thereof is omitted.

Figure 5:
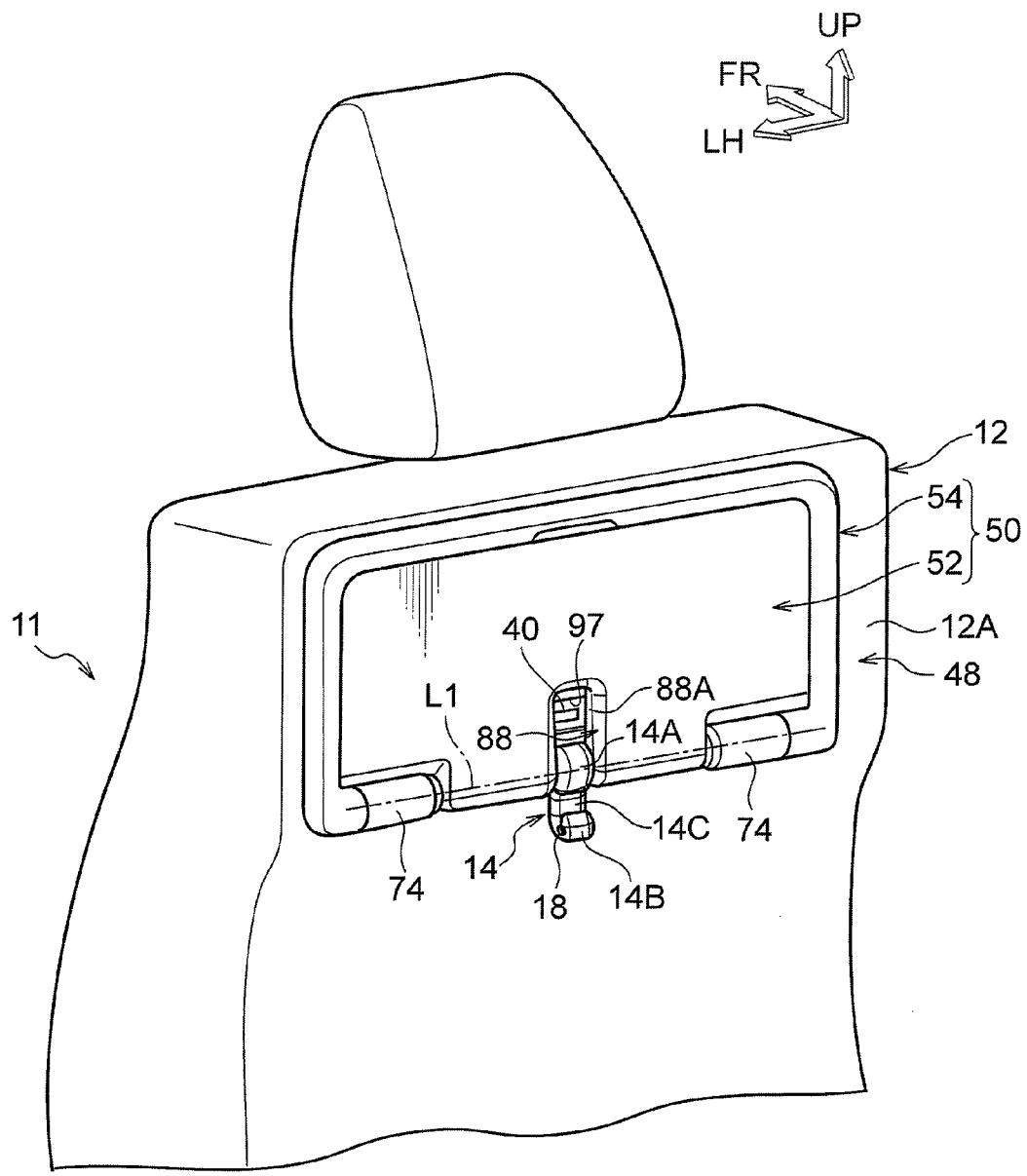
FIG. 5 is a perspective view illustrating an port usable state of a vehicle USB port of a second exemplary embodiment of the invention when a table is stowed, viewed diagonally from the rear.
Figure 6:
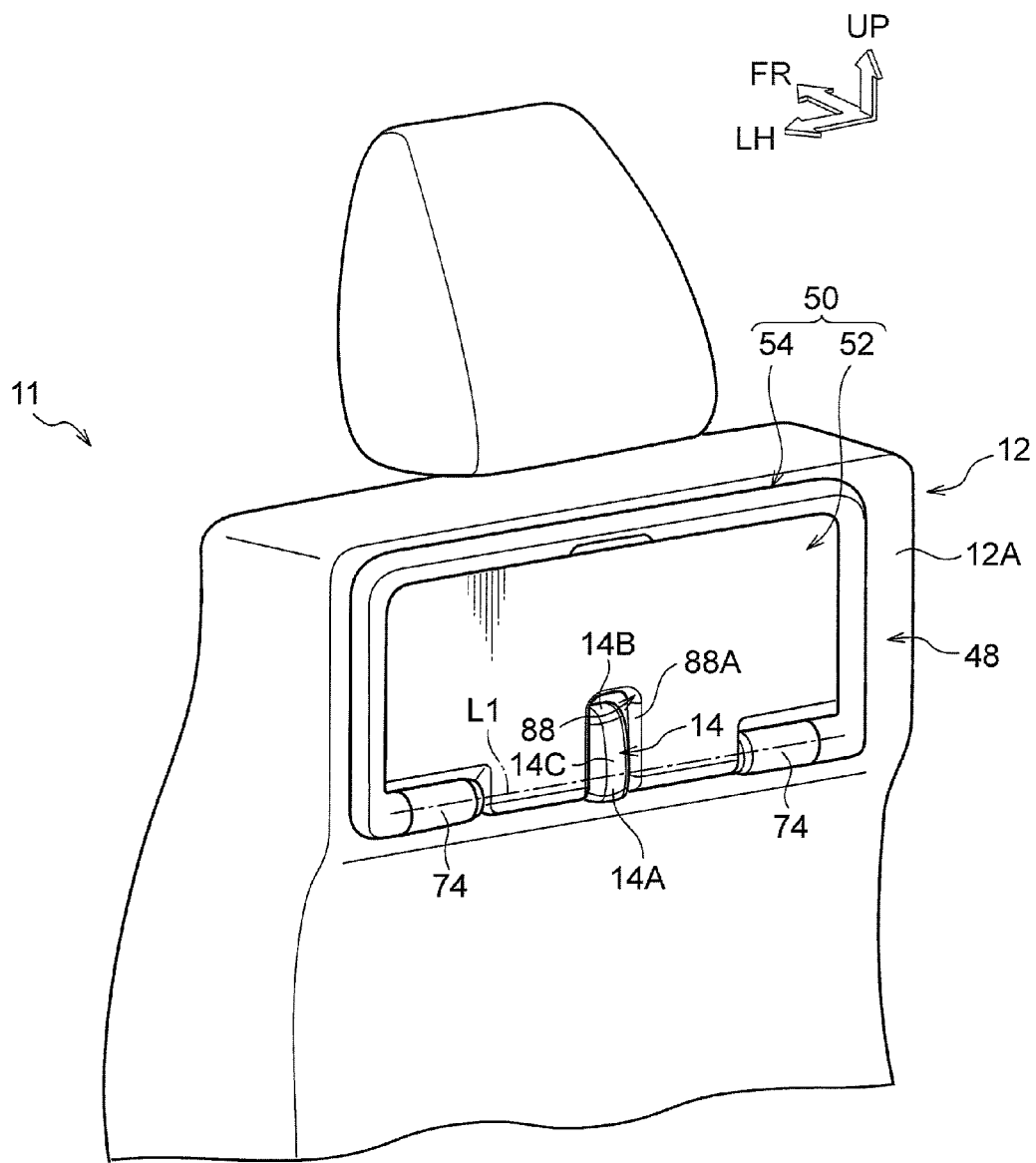
FIG. 6 is a perspective view illustrating a port not-in-use state of a vehicle USB port of the second exemplary embodiment of the invention when a table is not in use, viewed diagonally from the rear.

FIG. 5 is a perspective view illustrating a port usable state of a vehicle USB port 48, viewed diagonally from the vehicle rear. FIG. 6 illustrates a perspective view of a not-in-use state of a vehicle USB port 48, viewed diagonally from the vehicle rear. As an example, the vehicle USB port 48 is applied to a cup holder 50 provided at the upper portion of the back face 12A of the seatback 12 of the seat 11.

Figure 7:
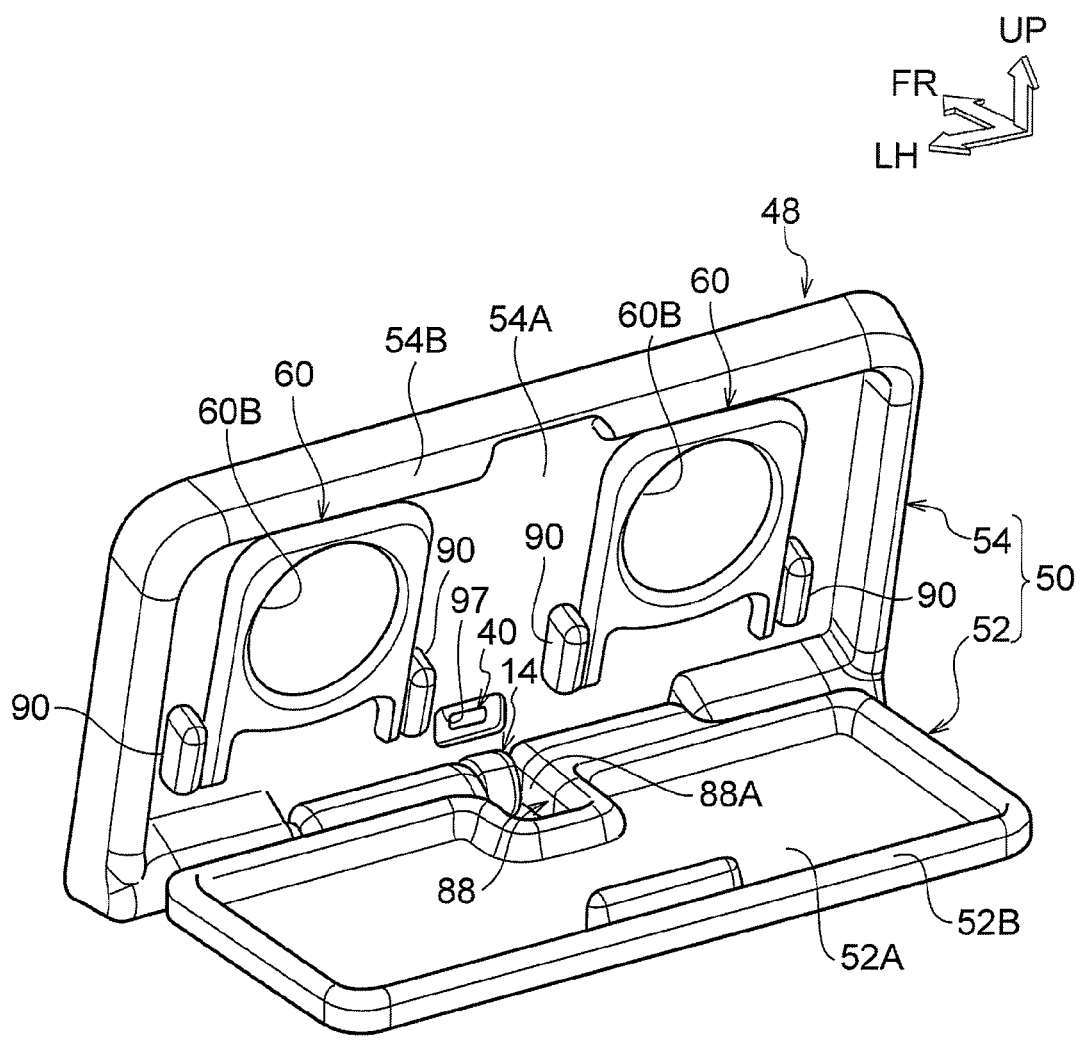
FIG. 7 is a perspective view illustrating an port usable state of a vehicle USB port of the second exemplary embodiment of the invention when a table is in use, viewed diagonally from the rear.

As illustrated in FIG. 7, the cup holder 50 includes a table 52 as a rectangular shaped base body with its length direction in the vehicle width direction, and the table 52 includes a container supporting face 52A that supports a bottom portion of a container retained by the cup holder 50. A raised portion 52B is formed at an outer peripheral portion of the container supporting face 52A of the table 52, protruding toward what is the upward direction when the table 52 is in an in-use position.

Figure 11:
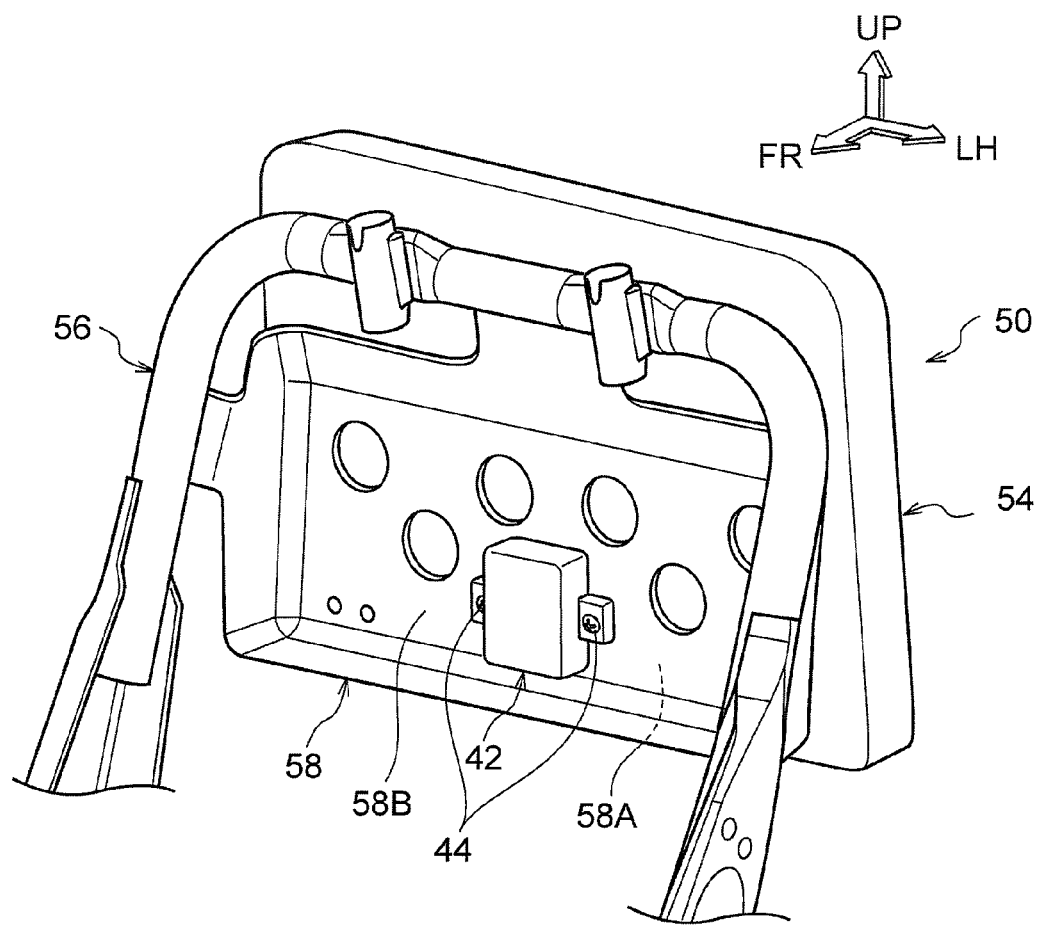
FIG. 11 is a perspective view illustrating a vehicle USB port of the second exemplary embodiment of the invention, viewed diagonally from the front.

As illustrated in FIG. 11, the cup holder 50 includes a rectangular shaped holder support 54 with its length direction in the vehicle width direction. The holder support 54 is fixed by fixing members such as screws, not illustrated in the drawings, to a rear face 58A of a seatback top panel 58 serving as a vehicle-body-side member fixed to an upper portion of a seatback frame 56.

As illustrated in FIG. 7, the table 52 is rotatably attached to a lower end of the holder support 54. The holder support 54 includes a holder supporting face 54A that supports holder main bodies 60. A raised portion 54B at an outer peripheral portion of the holder supporting face 54A of the holder support 54 is formed protruding toward what is the rear in a state in which the holder support 54 is fixed to the rear face 58A of the seatback top panel 58.

The table 52 is rotatable between a stowed position when moved to the holder support 54 side and retained inside the raised portion 54B of the holder support 54, as illustrated in FIG. 5, and the in-use position in which the container supporting face 52A is stationed so that the container supporting face 52A is horizontal, as illustrated in FIG. 7.

Figure 10:
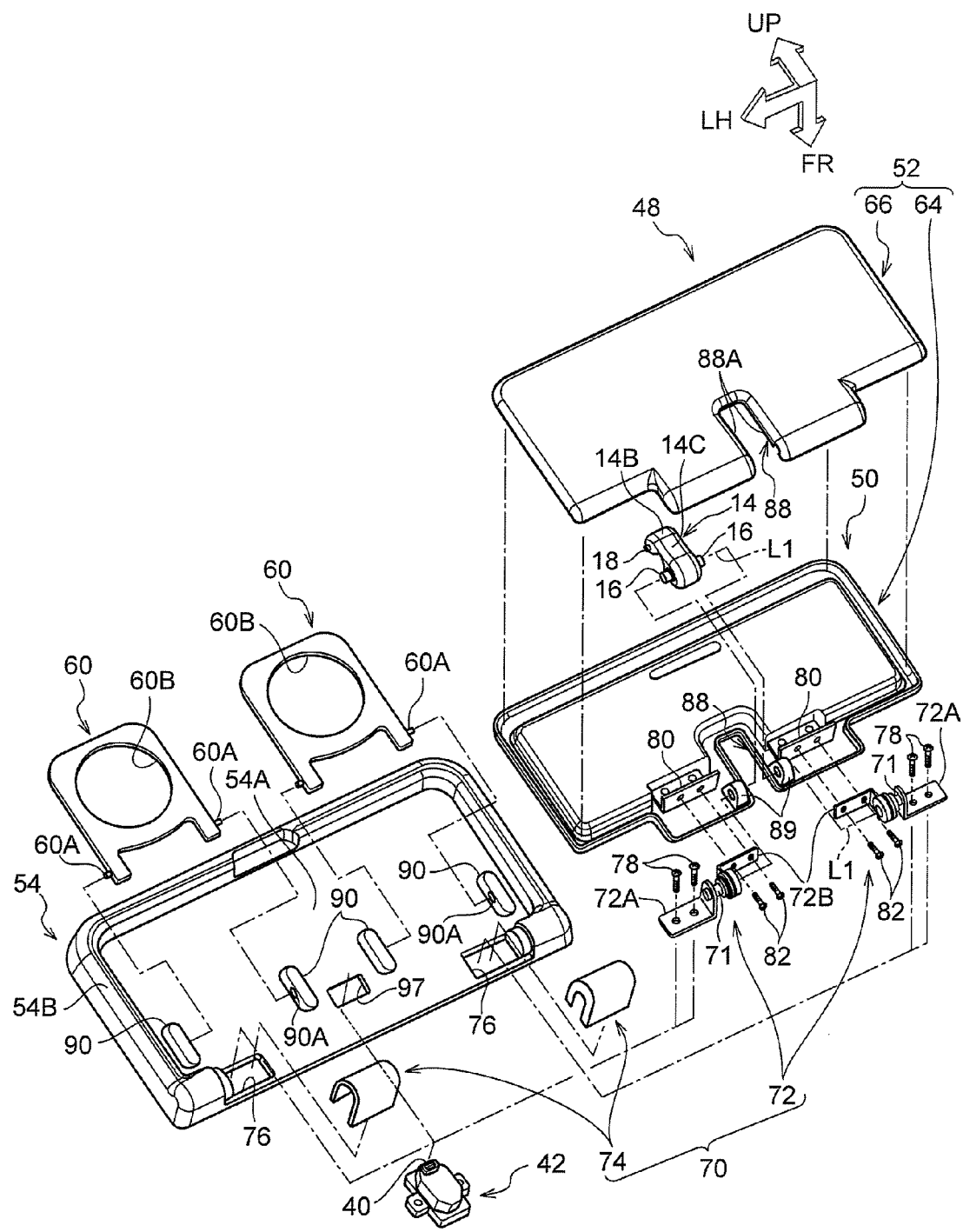
FIG. 10 is an exploded perspective view illustrating a vehicle USB port of the second exemplary embodiment of the invention, viewed diagonally from the rear.

Specifically, as illustrated in FIG. 10, the table 52 includes a table main body 64, and an undercover 66 covering a back face of the table main body 64. The table 52 is attached to a lower end of the holder support 54 by a pair of left and right hinge portions 70 provided at a lower end position when the table 52 is in the stowed position. Each of the hinge portions 70 includes a hinge main body 72 and a cover 74, and one portion 72A of each of the hinge main bodies 72 is rotatably attached to a rotation shaft 71 and fixed by fixing members 78 such as screws to the rear face 58A of the seatback top panel 58 illustrated in FIG. 11, through an opening 76 of the holder support 54. The other portion 72B of each of the hinge main bodies 72 is rotatably attached to the rotation shaft 71 and is fixed by fixing members 82 such as screws to an attachment portion 80 formed at the table main body 64.

As illustrated in FIG. 5, an interference prevention cutout 88, serving as an upward-facing hook main body retaining portion, is formed in a linear shape at a left-right direction center location forming a lower end of the table 52 when in the stowed position. The hook main body 14 is provided inside the interference prevention cutout 88 so as to be stowable therein.

As illustrated in FIG. 10, left and right shaft bearing portions 89 that rotatably support the left and right direction rotation shafts 16 of the hook main body 14 are formed at the table main body 64. The shaft bearing portions 89 are disposed at the opening side ends of the interference prevention cutout 88 of the table main body 64, facing each other with the interference prevention cutout 88 interposed therebetween. The rotation shafts 71 of the hinge portions 70 of the table 52 of the cup holder 50 are coaxial to the rotation shafts 16 of the hinge portion 14A of the hook main body 14 (see the reference numerals L1 illustrated in FIG. 5, FIG. 6 and FIG. 10). The cover 74 of each the hinge portions 70 cover the one portion 72A of the hinge main body 72.

The left and right protrusions 18 of the hook portion 14B contact left and right side walls 88A of the interference prevention cutout 88 when the hook main body 14 has been moved to the stowed position and the hook main body 14 pressed into the interference prevention cutout 88, so as to retain the hook main body 14 in the stowed position.

The hook main body 14 is thereby rotatable about the center of rotation of the rotation shafts 16, between the stowed position in which the hook main body 14 is stowed inside the interference prevention cutout 88 formed at the table 52 of the cup holder 50 illustrated in FIG. 6, and the in-use position in which the hook main body 14 is rotated downward from the stowed position, as illustrated in FIG. 5. Regardless of whether the table 52 is in the stowed position illustrated in FIG. 5, or the in-use position illustrated in FIG. 7, the hook main body 14 is rotatable between the in-use position and the stowed position due to the interference prevention cutout 88.

As illustrated in FIG. 7, the pair of holder main bodies 60 are disposed to the holder supporting face 54A aligned in the left-right direction, and each of the holder main bodies 60 is rotatably attached to the holder supporting face 54A.

Specifically, as illustrated in FIG. 10, rotation shafts 60A are formed protruding toward the left-right direction outsides at a rotation shaft side end of the holder main body 60, the lower end when in the stowed state. The rotation shafts 60A are axially supported so as to enable rotation by shaft holes 90A of a pair of left and right shaft receiving portions 90 formed protruding from the holder supporting face 54A of the holder support 54. Note that a circular shaped container insertion opening 60B is formed at each of the holder main bodies 60.

In the present exemplary embodiment, a rectangular shaped port opening 97, with its length direction in the vehicle left-right direction, is formed at a left-right direction central lower portion of the holder supporting face 54A of the holder support 54.

As illustrated in FIG. 11, the base plate 42, to which the USB port 40 is fixed, is fixed to a front face 58B of the seatback top panel 58 by fixing members 44 such as screws. As illustrated in FIG. 7, the leading end of the USB port 40 faces the port opening 97 formed at the cup holder 50.

Second Exemplary Embodiment Operation and Advantageous Effects

As illustrated in FIG. 6, in the present exemplary embodiment, the hook main body 14 is retained in the interference prevention cutout 88 formed at the table 52 of the cup holder 50 when the hook main body 14 has been moved to the stowed position. The lid portion 14C of the hook main body 14 covers the port opening 97 when the hook main body 14 has been moved to the stowed position. The hook main body 14 can thereby prevent water, dust, and the like from adhering to the USB port 40 through the port opening 97, enabling the USB port 40 to be protected. The hook main body 14 is normally provided at an upper portion of the back face 12A of the seatback 12 of the seat 11 in order to hang the bag 15, a shopping bag, or the like thereon. There is accordingly no need to provide a separate shutter in order to protect the USB port 40, so that there is no increase in the number of components. This enables the USB port 40 to be protected without increasing the number of components, similarly to in the first exemplary embodiment In the present exemplary embodiment, the rotation shafts 71 of the hinge portions 70 of the table 52 of the cup holder 50 are coaxial to the rotation shafts 16 of the hinge portion 14A of the hook main body 14, and the table 52 moves between the stowed position illustrated in FIG. 5 and FIG. 6 and the in-use position illustrated in FIG. 7 to FIG. 9 due to the hinge portions 70. Due to the presence of the interference prevention cutout 88 formed at the table 52, there is no interference between the table 52 and the hook main body 14, regardless of whether the table 52 is in the in-use position or in the stowed position. As a result, the hook main body 14 is rotatable between the in-use position and the stowed position, regardless of whether the table 52 is in the stowed position or in the in-use position. The hook main body 14 is thus movable to the in-use position enabling the USB port 40 to be used, regardless of whether the table 52 is in the stowed position or in the in-use position.

Figure 8:
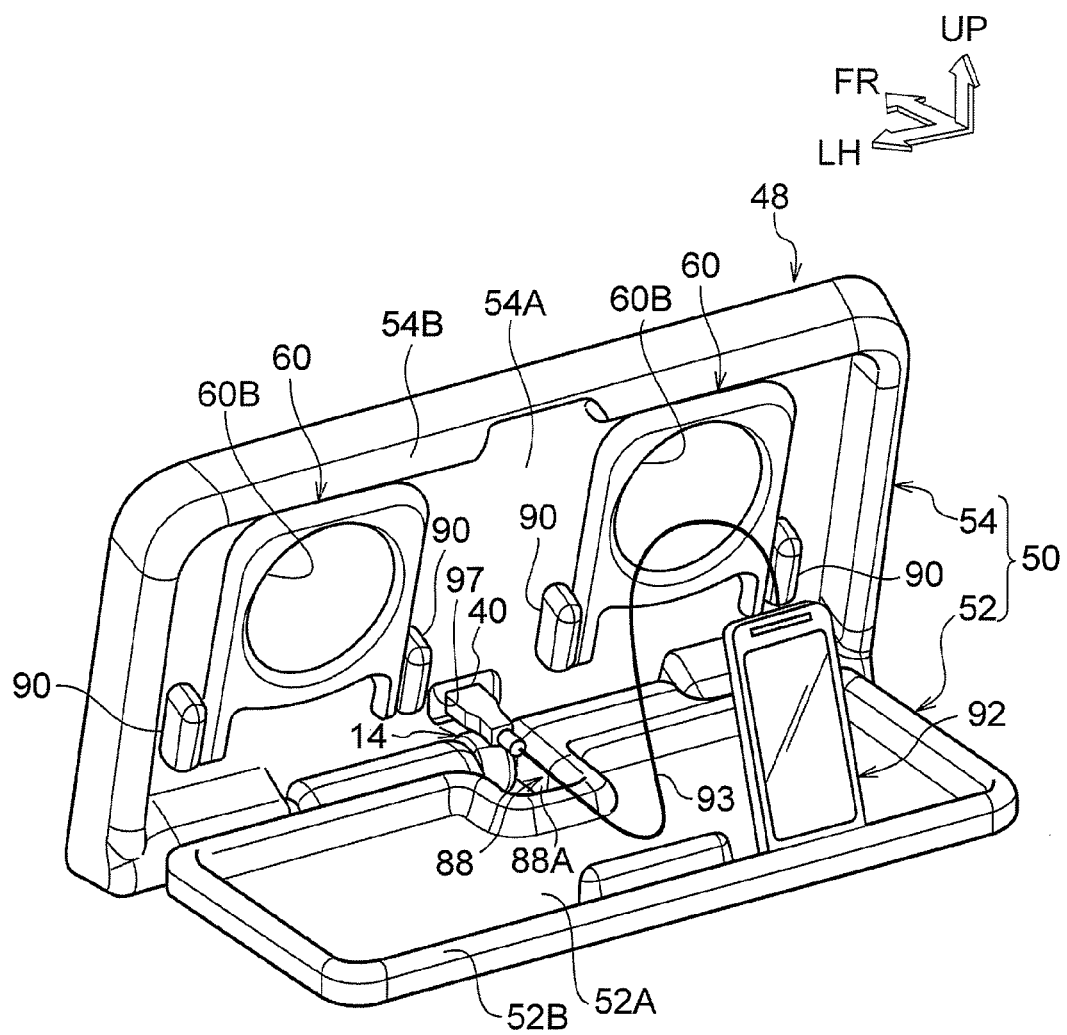
FIG. 8 is a perspective view illustrating an port usable state of a vehicle USB port of the second exemplary embodiment of the invention when a table is in use, viewed diagonally from the rear.
Figure 9:
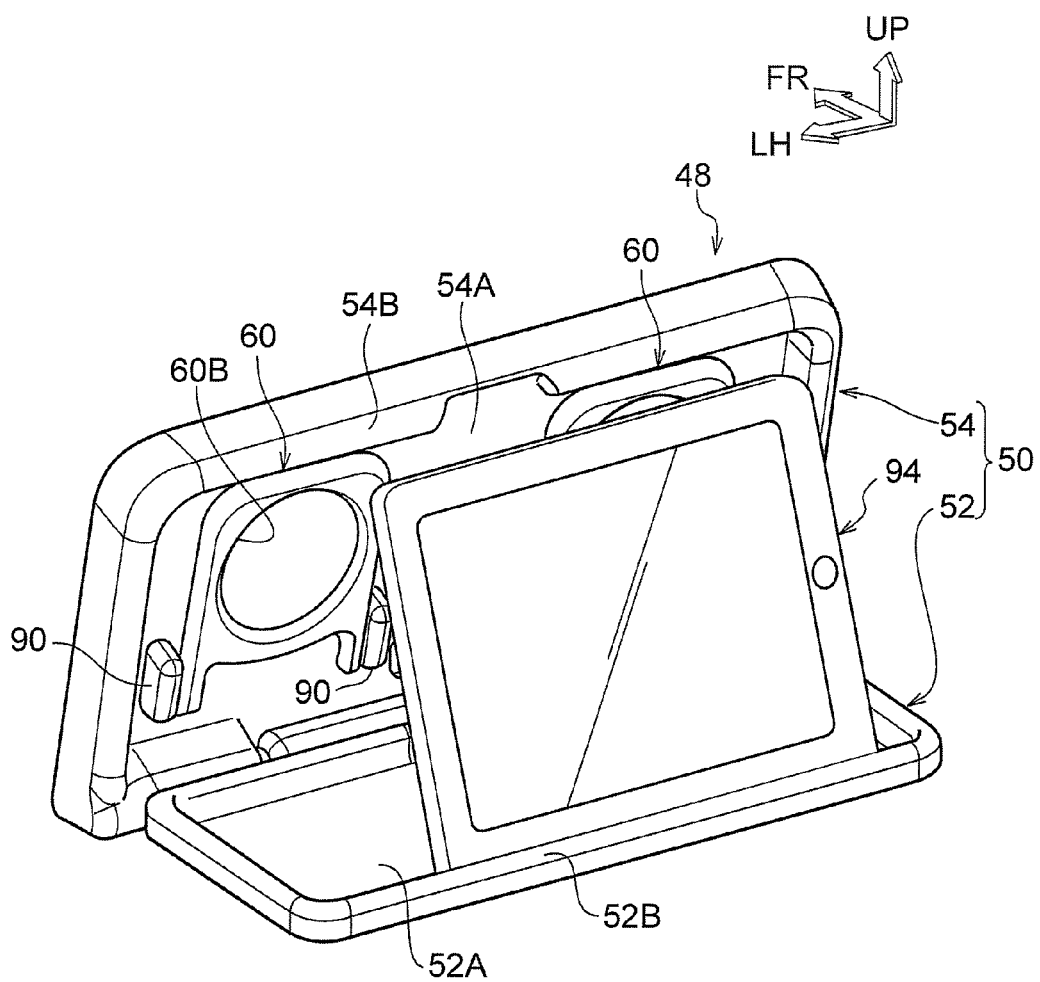
FIG. 9 is a perspective view illustrating an port usable state of a vehicle USB port of the second exemplary embodiment of the invention when a table is in use, viewed diagonally from the rear.

As illustrated in FIG. 8, in the present exemplary embodiment, in a state in which a cell-phone 92 is placed on the table 52, the USB port 40 and the cell-phone 92 can be connected by a USB cable 93. Moreover, as illustrated in FIG. 9, in a state in which a tablet 94 is placed on the table 52 instead of the cell-phone 92, the USB port and the tablet 94 can be connected by a USB cable.

Supplementary Explanation of Exemplary Embodiments

Note that specific exemplary embodiments of the present invention have been described in detail above, however the present invention is not limited to such exemplary embodiments, and it would be obvious to a practitioner skilled in the art that various embodiments other than those above may be implemented within the scope of the present invention.

For example, in each of the above exemplary embodiments, the vehicle USB ports 10, 48 are provided to the upper portion of the back face 12A of the seatback 12 of the seat 11; however, a vehicle USB port may be provided at another location, such as an instrument panel console or an armrest inside the vehicle, instead.

What is claimed is:

1. A vehicle USB port comprising:
   a base body attached to a vehicle-body-side member;
   a hook main body that is provided with a hinge portion rotatably attached to the base body and a hook portion to anchor an anchored member, and that is rotatable between an in-use position in which the hook portion is usable and a stowed position in which the hook portion is not used;
   a hook main body retaining portion that is formed at the base body and that retains the hook main body moved to the stowed position;
   a port opening that is formed at the hook main body retaining portion and that is covered by the hook main body moved to the stowed position; and
   a USB port that is provided in a position facing the port opening, and to which a USB cable can be coupled through the port opening.

2. The vehicle USB port of claim 1, wherein in the hook main body:
   one end of the hook main body is the hinge portion;
   the other end of the hook main body is the hook portion; and
   a portion of the hook main body between the hinge portion and the hook portion configures a lid portion covering the port opening.

3. The vehicle USB port of claim 1, wherein
   the hinge portion is attached to one portion of the base body, and the inside of the base body includes a frame shaped raised portion forming the hook main body retaining portion.

4. The vehicle USB port of claim 1, wherein
   the USB port is fixed to a base plate attached to the vehicle-body-side member, and a leading end of the USB port faces the port opening.

5. The vehicle USB port of claim 1, wherein:
   the base body is configured as a table that is rotatable coaxially to the hook main body between the stowed position and the in-use position; and
   an interference prevention cutout is formed at the table such that the table does not interfere with the hook main body in either the in-use position or the stowed position.

* * * * *